United States Patent [19]
Gotoh et al.

[11] Patent Number: 5,621,760
[45] Date of Patent: Apr. 15, 1997

[54] SPEECH CODING TRANSMISSION SYSTEM AND CODER AND DECODER THEREFOR

[75] Inventors: Hiroki Gotoh; Seishi Sasaki; Masayasu Miyake, all of Sendai, Japan

[73] Assignee: Kokusai Electric Co., Ltd., Tokyo, Japan

[21] Appl. No.: 649,067

[22] Filed: May 16, 1996

Related U.S. Application Data

[63] Continuation of Ser. No. 917,832, Jul. 21, 1992, abandoned.

[51] Int. Cl.⁶ .......................... H04B 14/06; H03M 3/04
[52] U.S. Cl. .......................... 375/245; 375/249; 341/76; 341/143; 395/2.39; 395/2.09; 395/2.92
[58] Field of Search .................... 375/245, 249, 375/242, 243, 244, 241, 247; 341/76, 143, 51, 77; 381/29, 30; 395/2, 2.21, 2.39; 348/394

[56] References Cited

U.S. PATENT DOCUMENTS

| | | | |
|---|---|---|---|
| 4,385,393 | 5/1983 | Chaure et al. | 370/30 |
| 4,430,670 | 2/1984 | Netravali | 358/135 |
| 4,437,087 | 3/1984 | Petr | 341/51 |
| 4,460,923 | 7/1984 | Hirano et al. | 358/136 |
| 4,549,304 | 10/1985 | Weirich et al. | 375/245 |
| 4,573,167 | 2/1986 | Hentschke et al. | 375/245 |
| 4,574,383 | 3/1986 | Irie et al. | 375/27 |
| 4,592,070 | 5/1986 | Chow et al. | 395/2.21 |
| 4,725,885 | 2/1988 | Gonzales et al. | 358/135 |
| 4,743,967 | 5/1988 | Takenaka et al. | 348/412 |
| 4,847,866 | 7/1989 | Jones et al. | 375/245 |
| 4,866,510 | 9/1989 | Goodfellow et al. | 358/13 |
| 5,084,904 | 1/1992 | Daito | 375/245 |
| 5,115,241 | 5/1992 | Ishikawa | 341/143 |
| 5,136,377 | 8/1992 | Johnston et al. | 348/415 |
| 5,166,958 | 11/1992 | Shimokoriyama et al. | 375/292 |
| 5,230,060 | 7/1993 | Naitoh | 395/2 |
| 5,259,001 | 11/1993 | Corleto et al. | 375/245 |
| 5,317,522 | 5/1994 | Bonet et al. | 364/514 B |
| 5,319,573 | 6/1994 | Corleto et al. | 364/514 B |
| 5,349,383 | 9/1994 | Park et al. | 348/397 |
| 5,369,439 | 11/1994 | Matsuda et al. | 348/405 |
| 5,404,168 | 4/1995 | Yamada | 348/405 |
| 5,412,484 | 5/1995 | Yoshikawa | 358/433 |

OTHER PUBLICATIONS

Hatori, "Adaptation Predictive Coding Syst. for TV Sig" 9–25–80, abstract.
Thomson "TV Picture Data Comp. using diff encod . . device" 25–6–82, Abstract.
Tuegane et al, "Syst,. for Cody Video Signal in Block Unit" 9 Nov. 1992, abstract.
Arp, "Exact Models for Predict. Pic Signals . . Transmission" Sep. 1974, abstract.
Lorenz, "Difference PCM TV Sig's Retrieval Syst" 29 Aug. 1974, abstract.
Tescher, "Image Cody: Variable Rate Diff . . . Fixed rate Channel", 1977, abstract.
Liao, "A DPCM Technique w/deal Code Assign," 1981, abstract (i.e. 1st page).

Primary Examiner—Wellington Chin
Assistant Examiner—William Luther
Attorney, Agent, or Firm—Emmanuel J. Lobato; Burns & Lobato, P.C.

[57] ABSTRACT

A speech coding transmission system is disclosed in which a coder of a differential coding system quantizes a difference between a predictive value from an adaptive predictor and an input speech signal by an adaptive quantizer in accordance with the level of the latter and to send out the resulting coded signal to transmission medium, and a decoder outputs a reproduced speech signal on the basis of a residual signal obtained by inversely quantizing a received coded signal with an inverse adaptive quantizer and a predictive value from an adaptive predictor. Both or either one of the coder and the decoder includes a comparator-attenuator which attenuates the amplitude of the input signal or reproduced speech signal to a value smaller than a predetermined threshold value and applies to the amplitude-attenuated speech signal to the adaptive predictor.

5 Claims, 4 Drawing Sheets

SPEECH CODING TRANSMISSION SYSTEM AND CODER AND DECODER THEREFOR

This is a continuation of application Ser. No. 07/917,832, filed Jul. 21, 1992, now abandoned.

BACKGROUND OF THE INVENTION

The present invention relates to countermeasures for transmission errors in a speech coding transmission system.

Analog or digital data transmission has long used wire telecommunication networks, in which errors during transmission are very rare, and it has been known that the error rate is in the range of $10^{-4}$ to $10^{-8}$.

With such a technical background, speech coders and speech decoders have been developed for application to a digital data transmission system via a wire telecommunication network. For example, a speech coder or decoder of an adaptive differential PCM (ADPCM) system has been developed on the assumption of an error rate less than $10^{-4}$.

The wire telecommunication network is now partly being substituted by radio transmission for a cordless telephone system, for example. From the viewpoint of matching with the wire telecommunication network, it is appropriate, in this instance, to use a conventional speech coder or decoder such as the ADPCM system.

In radio transmission, however, occurrence of a transmission is inevitable. If the real-time transmission in the radio transmission system is ignored, the transmission errors could be reduced to some extent by repeating or like technique, but the repeating technique cannot be used in speech signal processing as of conversation voice signal because the real-time property (a delay time in the range of 10 to 20 ms) is requisite to such signal processing.

Accordingly, it is necessary to take some countermeasures for errors in the application of the speech coder or decoder to the system wherein the wire telecommunication network partly includes a radio section. One possible method is the use of an error correcting code, but this method has a defect of an increase in the quantity of information to be transmitted. Therefore, if an appropriate countermeasure can be made by the speech coder or decoder itself against errors, its utility value will be great. However, such a technique is unknown, because the speech coder or decoder intended primarily for use in the wire telecommunication network as mentioned above has not been applied to the radio telecommunication network in the past.

SUMMARY OF THE INVENTION

An object of the present invention is to provide a speech coding transmission system and a speech coder or decoder with comparator-attenuator which lessens the influence on a reproduced speech signal by transmission errors in the radio section, thereby alleviating deterioration of the quality of the reproduced speech.

A speech coding transmission system according to the present invention comprises a coder of a differential coding system which quantizes a difference between a predictive value from an adaptive predictor and an input speech signal by an adaptive quantizer in accordance with the level of the latter and delivers a coded signal and a decoder which outputs a reproduced speech signal on the basis of a residual signal obtained by inversely quantizing the received coded signal with an inverse adaptive quantizer and a predictive value from an adaptive predictor. The speech coding transmission system according to the present invention is characterized in that both or either one of the coder and the decoder includes the comparator-attenuator which attenuates the amplitude of the input speech signal or reproduced speech signal to a value smaller than a predetermined threshold value and provides the amplitude-attenuated speech signal to the adaptive predictor.

BRIEF DESCRIPTION OF THE DRAWINGS

The present invention will be described in detail below with reference to the accompanying drawings, in which.

PREFERED EMBODIMENTS OF THE INVENTION

Figure 2:
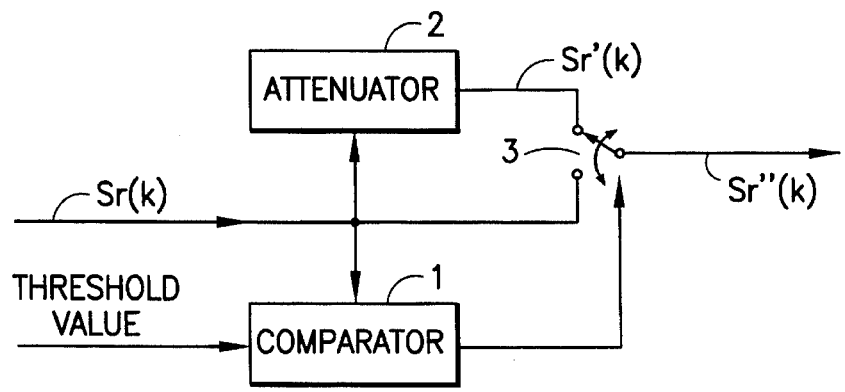
FIG. 2 is a block diagram showing the principal part of the present invention.

FIG. 2 is a block diagram of the comparator-attenuator which constitutes the principal part of the present invention.

At first, an input reproduced signal Sr(k) and a threshold value are compared with each other by a comparator 1, and when the level of the reproduced signal Sr(k) exceeds the threshold value, a switch 3 is connected to an attenuator 2 to output therefrom an attenuated reproduced signal Sr' (k), whereas when the level of the reproduced signal Sr(k) does not exceed the threshold value, the input reproduced signal is output intact via the switch 3. Thus, the amplitude of a reproduced signal Sr'(k) which is ultimately output is limited to a certain level range.

By incorporating the comparator-attenuator into either one or both of the speech coder and decoder, the speech coder or decoder with the comparator-attenuator is formed. That is, also in the coder an impulse-like speech signal is attenuated in a coder to a certain level, by which an impulse-like noise caused by transmission errors can be detected with ease at a decoder. In this instance, the impulse-like speech signal is suppressed in the coder but this is very rare in ordinary speech communication. Furthermore, adjustment of the attenuation of the comparator-attenuator does not exert any influence on the speech signal and the provision of the comparator-attenuator according to the present invention scarcely deteriorates the reproduced signal quality.

Next, a description will be given of an embodiment of the present invention in which the above-mentioned comparator-attenuator is incorporated in both of the coder and decoder of the speech coder/decoder of the ADPCM system.

Figure 1:
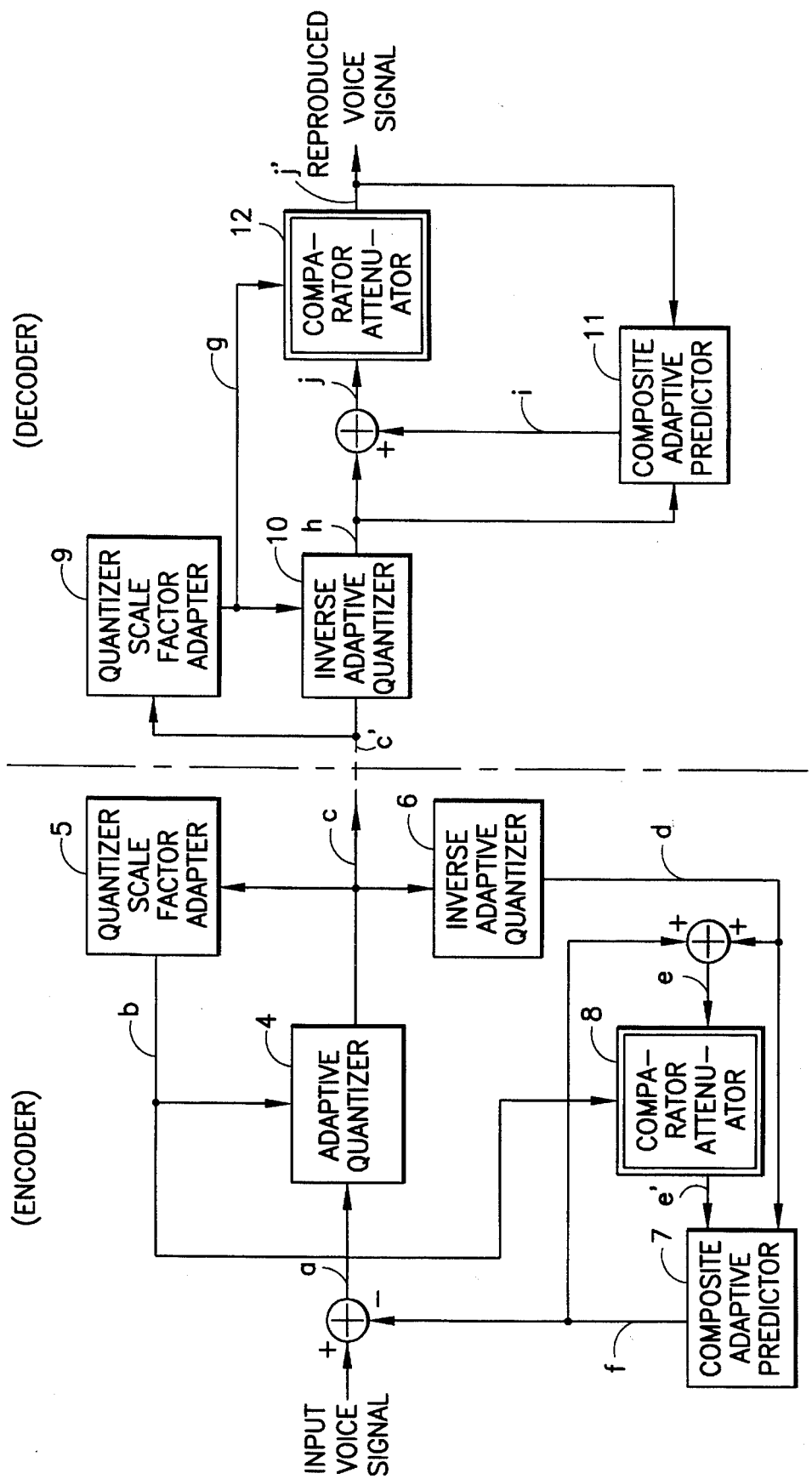
FIG. 1 is a block diagram illustrating an embodiment of the present invention.

FIG. 1 is a block diagram of the ADPCM speech coder and decoder with the comparator-attenuator according to the present invention. The flow of its processing is given below.

In the coder:

(1) A difference between the input speech signal and a reproduced signal of an immediately preceding step, i.e. a predictive signal f is detected (that is, a residual signal a is obtained).

(2) The input residual signal a is adaptively quantized after adjustment of its level by an adaptive quantizer 4, and the quantized output is transmitted as a coded output c.

(3) The quantization values for the above quantization, that is, a quantizer-scale factor b, is produced by a quantizer-scale factor adapter 5.

(4) Based on the quantized value (i.e. the coded output) by the adaptive quantizer, a reproduced residual d is reproduced by an inverse adaptive quantizer 6 and is then output therefrom.

(5) The reproduced residual d and the predictive signal f of the immediately preceding step are used to reproduce a reproduced signal e.

(6) The reproduced signal e is applied to a comparator-attenuator 8 provided according to the present invention, and when the reproduced signal e exceeds a threshold value, the reconstructed signal is attenuated and is output as an attenuated reproduced signal e'.

(7) The reconstructed signal e' is applied to a composite adaptive predictor 7, which generates the predictive signal f which is used for the prediction in the next step.

(8) A difference between the predictive signal f from the composite adaptive predictor 7 and the input speech signal of the next step is quantized following the above procedure.

The above is the flow of processing on the side of the coder.

In decoder:

(1) Based on a coded output c' which is the coded output c influenced by the transmission line (a radio channel, for example) during transmission, the quantization value, i.e. a quantizer-scale factor Y(k)g is computed by a quantizer-scale factor adaptor 9 and output therefrom.

(2) The quantizer-scale factor q and the coded output c' are input into an inverse adaptive quantizer 10, wherein a residual h is decoded.

(3) The decoded residual h and a regenerated speech signal j' of the immediately preceding step are used to obtain a predictive signal i in a composite adaptive predictor 11.

(4) The predictive signal i and the decoded residual h are added together to synthesize a reproduced speech signal j.

(5) The reproduced speech signal j is input into a comparator-attenuator 12 which is a characteristic feature of the present invention, and when the input exceeds a threshold value, the former is regarded to contain transmission errors, the reproduced speech signal j is attenuated, thereafter being output as a reproduced speech j.

(6) As in the case of the coder, the reproduced speech signal j' is input into the composite adaptive predictor 11, which generates the predictive signal i which is used for prediction in the next step.

Figure 3:
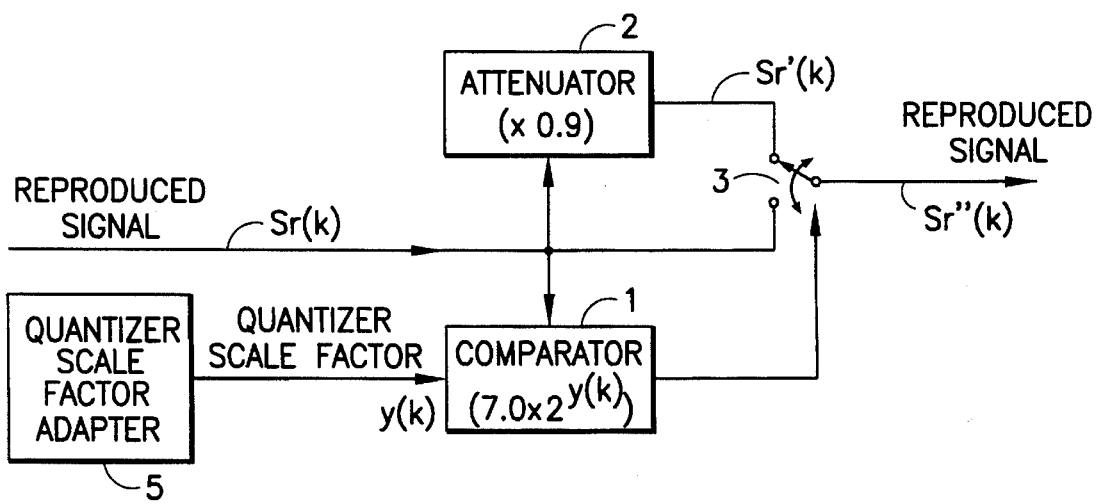
FIG. 3 is a block diagram showing the principal part of the present invention.

FIG. 3 is a block diagram of the comparator-attenuator which forms the principal part of the present invention. In the case of an adaptive coding system such as the ADPCM system, it is preferable not to hold the threshold value invariable but to determine it based on a variable closely related to the reproduced speech, such as the quantizer-scale factor.

Figure 4A:
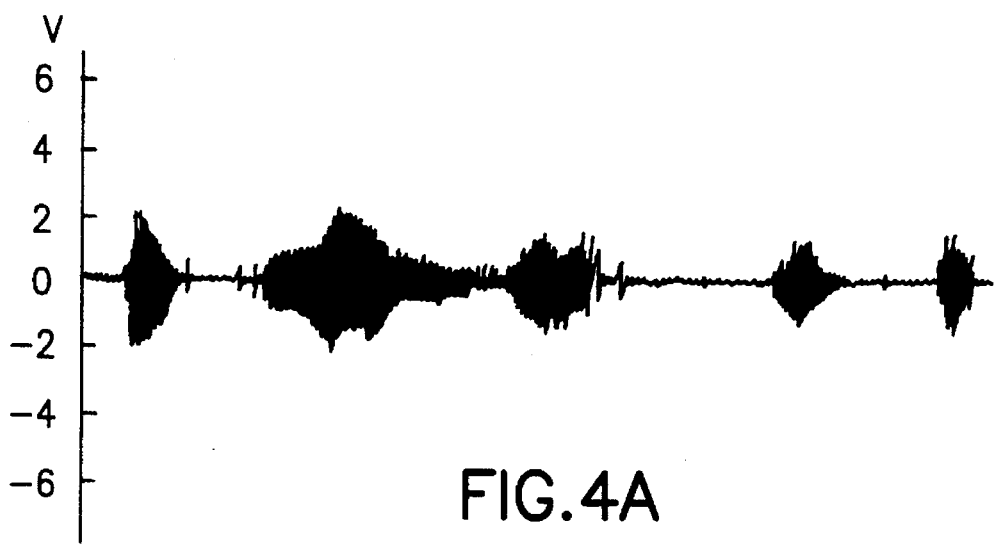
FIGS. 4a and 4b show reproduced waveforms by a 32-kbps ADPCM speech coder/decoder.
Figure 4B:
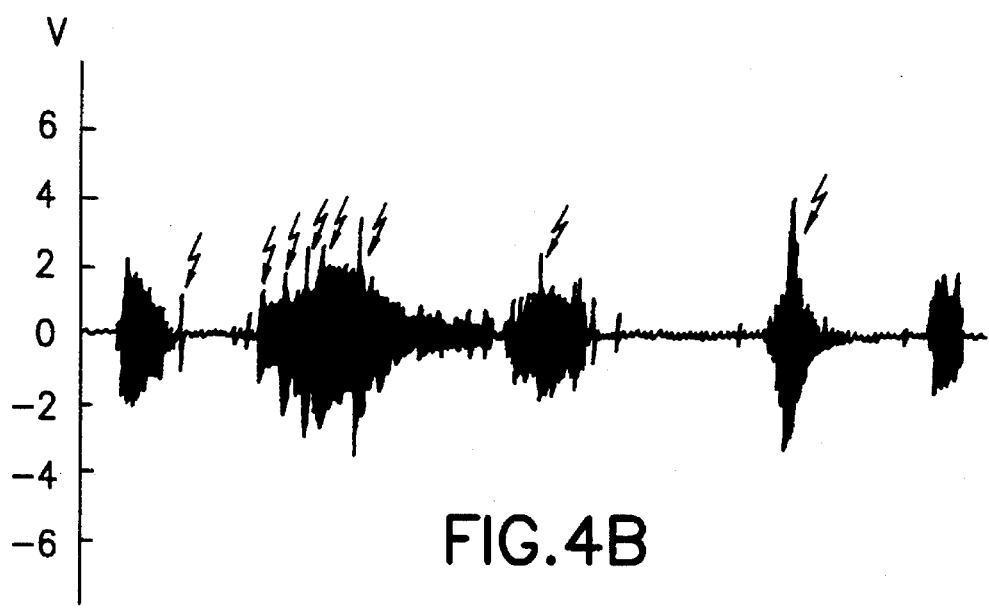

To show an example of the influence of transmission errors, FIG. 4 depicts waveforms of reproduced speech signals by 32-kbps ADPCM speech coder or decoder. FIG. 4(A) shows a waveform in case of no error, and FIG. 4(B) a waveform in a case where errors of an error rate $10^{-2}$ occurred. It is seen from FIG. 4(B) that impulsive noises of very large amplitudes (as indicated by arrows in FIG. 4(B)) unseen in FIG. 4(A) are superimposed.

Now, a description will be given of the result obtained in a case where the threshold value was determined on the basis of the quantizer-scale factor Y(k).

Figure 5A:
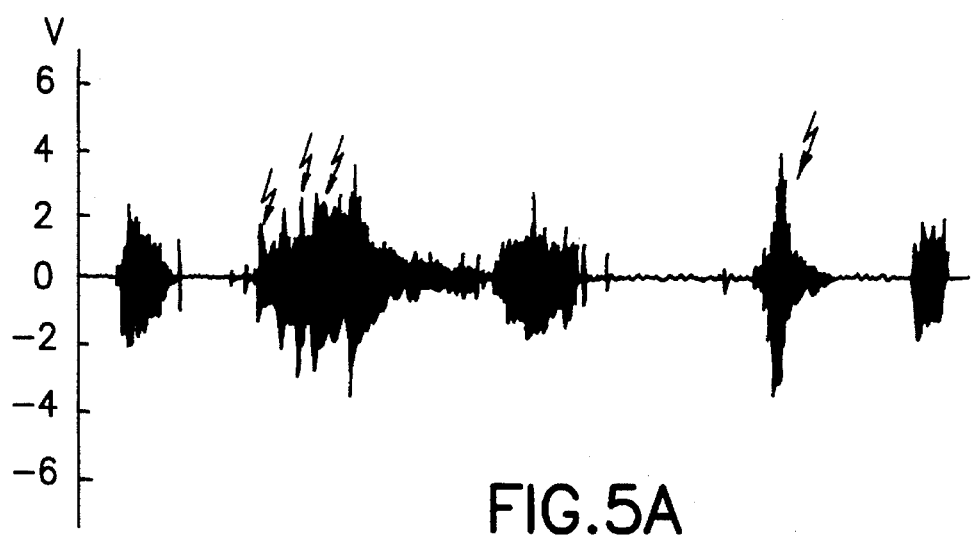
FIGS. 5a and 5b show reproduced waveforms for explaining the effect of the present invention.
Figure 5B:
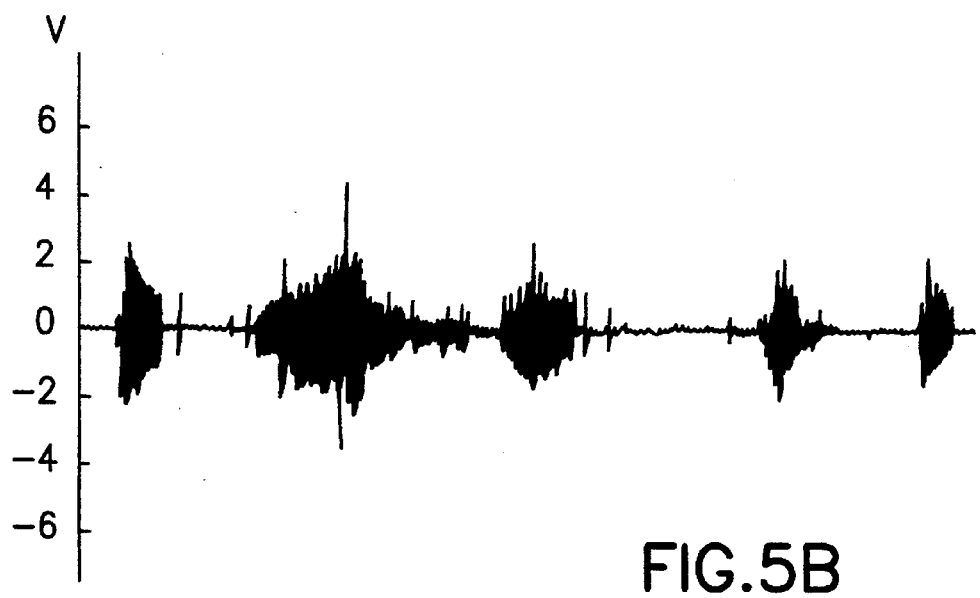

FIG. 5 is waveform diagram for explaining the effect of the present invention, showing the result of using the 32-kbps ADPCM speech coder/decoder with the comparator-attenuator. FIG. 5(A) shows waveforms obtained in the case of the prior art without the comparator-attenuator, and FIG. 5(B) shows waveforms obtained with the present invention employing the comparator-attenuator. In this case, the threshold value was set to $7 \times 2^{Y(k)}$ through utilization of the quantizer-scale factor Y(k) and the coefficient of attenuation was set to 0.9. As shown in FIG. 5, the influence of the transmission error on the reproduced speech waveform is lessened by the provision of the comparator-attenuator (portions where noise was reduced being indicated by arrows in FIG. 5(A)). Quantitatively, the use of the present invention improved the segmental SNR by about 1.7 dB and the cepstrum distance (a spectral envelope distortion) by around 0.2 dB. Besides, an unpleasant impulse-like crackling noise was also reduced.

Moreover, the throughput by the present invention is as small as 0.11 MIPS, which is about 2.5% of the throughput (about 4.4 MIPS) of the ADPCM decoder.

While in the above the present invention has been described as being applied to the ADPCM speech coder/decoder, the invention is also applicable to speech coder/decoders of other systems.

As described above in detail, the incorporation of the comparator-attenuator in the speech coder/decoder makes it possible to decrease an impulse-like noise, which is caused by transmission errors and to improve the reproduced speech quality by about 21% in terms of segmental SNR and about 14% in terms of cepstrum distance. This permits communications of higher quality in a system which includes a radio section in which transmission errors are likely to occur. In addition, since the throughput is very small, the addition of the comparator-attenuator does not markedly increase power consumption. Hence, the present invention is of great utility when employed in radio equipment which is required to be low in power consumption.

What we claim is:

1. A speech coding transmission system using adaptive differential PCM comprising:

a coder receptive of an input speech signal for producing a coded output from said adaptive differential PCM by quantizing a difference between a first predictive value from a first composite adaptive predictor and the input speech signal by use of an adaptive quantizer in accordance with a level of the difference to send out the coded output to a transmission medium; and a decoder receptive of the coded output from the transmission medium for demodulating the coded output by inversely quantizing the coded output with an inverse adaptive quantizer to produce a decoded residual and by adding the decoded residual to a second predictive signal from a second composite adaptive predictor to reproduce a reproduced speech signal;

at least one of said coder and said decoder comprising a comparator-attenuator for attenuating an amplitude of an input signal to the first composite adaptive predictor or the second composite adaptive predictor to a value smaller than a predetermined value.

2. A speech coding transmission system using adaptive differential PCM comprising:

a coder receptive of an input speech signal for producing a coded output from said adaptive differential PCM by quantizing a difference between a first predictive value from a first composite adaptive predictor and the input speech signal by the use of an adaptive quantizer in accordance with a level of the difference to send out the coded output to a transmission medium, said coder comprising a first-comparator-attenuator for attenuating an amplitude of an input signal to the first composite adaptive predictor to a value smaller than a predetermined threshold value; and a decoder receptive of the coded output from the transmission medium for demodulating the coded output by inversely quantizing the coded output with an inverse adaptive quantizer to produce a decoded residual to a second predictive signal from a second composite adaptive predictor to reproduce a reproduced speech signal, said decoder comprising a second comparator-attenuator for attenuating an amplitude of an input signal to the second composite adaptive predictor to a value smaller than a predetermined threshold value;

a quantizer-scale factor of the adaptive quantizer and a first attenuation value of the first comparator-attenuator being adjusted in accordance with a first quantizer-scale factor from a first quantizer-scale factor adapter connected to an output of the adaptive quantizer;

a quantizer scale factor of the inverse adaptive quantizer and a second attenuation value of the second comparator-attenuator being adjusted in accordance with a second quantizer-scale factor from a second quantizer-scale factor adapter connected to an input of the inverse adaptive quantizer.

3. A coder comprising:

an input terminal receptive of an input speech signal;

a composite adaptive predictor for producing a predictive signal from a reproduced residual and an attenuated reproduced signal;

a subtractor for obtaining a difference between the input speech signal and the predictive signal to produce an input residual signal;

an adaptive quantizer for quantizing the input residual signal in accordance with a quantizer-scale factor to produce an adaptive differential PCM coded output;

a quantizer-scale factor adapter for generating the quantizer-scale factor from the adaptive differential PCM coded output;

an inverse adaptive quantizer for inversely quantizing the adaptive differential PCM coded output to produce the reproduced residual applied to the composite adaptive predictor;

an adder for adding the reproduced residual on the predictive signal to produce a reproduced signal;

a comparator-attenuator for attenuating the reproduced signal, when a level of the reproduced signal exceeds a threshold value, to produce the attenuated reproduced signal applied to the composite adaptive predictor; and an output terminal for sending out the adaptive differential PCM coded output to a transmission medium.

4. A decoder comprising:

an input terminal receptive of an adaptive differential PCM coded output frown a transmission medium;

a quantizer scale factor adapter receptive of the adaptive differential PCM coded output in accordance with the quantizer-scale factor to produce a decoded residual;

an inverse adaptive quantizer for inversely quantizing the adaptive differential PCM coded output in accordance with the quantizer-scale factor to produce a decoded residual;

a composite adaptive predictor for producing a predictive signal from the decoded residual and an attenuated reproduced signal;

an adder for adding the decoded residual on the predictive signal to produce a speech signal;

a comparator-attenuator for attenuating the speech signal, when a level of the speech signal exceeds a threshold value, to produce the attenuated reproduced signal applied to the composite adaptive predictor; and an output terminal for sending out the attenuated reproduced signal as a reproduced speech signal.

5. A speech coding transmission system using adaptive differential PCM, comprising:

a coder receptive of an input speech signal for producing a coded output to be sent out to a transmission medium; and a decoder receptive of the coded output from the transmission medium for demodulating the coded output to reproduce a reproduced speech signal of the input speech signal;

said coder comprising:

an input terminal receptive of the input speech signal;

a first composite adaptive predictor for producing a first predictive signal from a reproduced residual and a first attenuated reproduced signal;

a subtractor for obtaining a difference between the input speech signal and the first predictive signal to produce an input residual signal;

an adaptive quantizer for quantizing the input residual signal in accordance with a first quantizer-scale factor to produce an adaptive differential PCM coded output;

a first quantizer-scale factor adapter for generating the first quantizer scale factor from the adaptive differential PCM coded output;

a first inverse adaptive quantizer for inversely quantizing the adaptive differential PCM code output to produce the reproduced residual applied to the first composite adaptive predictor;

a first adder for adding the reproduced residual on the first predictive signal to produce a reproduced signal;

a first comparator-attenuator for attenuating the reproduced signal, when a level of the reproduced signal exceeds a first threshold value, to produce the first attenuated reproduced signal applied to the first composite adaptive predictor; and an output terminal for sending out the adaptive differential PCM coded output to a transmission medium;

said decoder comprising:

an input terminal receptive of the adaptive differential PCM coded output from said transmission medium;

a second quantizer-scale factor adapter receptive of the adaptive differential PCM coded output for producing a second quantizer-scale factor;

a second inverse adaptive quantizer for inversely quantizing the adaptive differential PCM coded output in accordance with the second quantizer scale factor to produce a decoded residual;

a second composite adaptive predictor for producing a second predictive signal from the decoded residual and a second attenuated reproduced signal;

a second adder for adding the decoded residual on the second predictive signal to produce a decoded speech signal;

a second comparator-attenuator for attenuating the decoded speech signal, when a level of the decoded speech signal exceeds a second threshold value, to produce the second attenuated reproduced signal corresponding to the reproduced signal and applied to the second composite adaptive predictor; and an output terminal for sending out the reproduced speech signal to a transmission medium.

* * * * *